(12) United States Patent
Koo et al.

(10) Patent No.: US 8,632,225 B2
(45) Date of Patent: Jan. 21, 2014

(54) OPTICAL LENS, LED MODULE HAVING THE OPTICAL LENS, AND LIGHTING APPARATUS HAVING THE LED MODULE

(75) Inventors: Won Hoe Koo, Seoul (KR); Sang Ho Yoon, Gyunggi-do (KR); Hyun Jung Kim, Seoul (KR); Ki Un Lee, Suwon (KR); Hyung Jin Kim, Seoul (KR); Kyeong Ik Min, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 13/181,998

(22) Filed: Jul. 13, 2011

(65) Prior Publication Data

US 2012/0051066 A1 Mar. 1, 2012

(30) Foreign Application Priority Data

Aug. 24, 2010 (KR) ........................ 10-2010-0082060

(51) Int. Cl.
- *F21V 7/00* (2006.01)
- *F21V 3/00* (2006.01)
- *F21V 5/00* (2006.01)

(52) U.S. Cl.
USPC ................. 362/311.06; 362/309; 362/311.02; 362/332

(58) Field of Classification Search
USPC ........ 362/311.06, 309, 310, 311.02, 332–340
See application file for complete search history.

(56) References Cited

U.S. PATENT DOCUMENTS

| | | | |
|---|---|---|---|
| 8,247,957 B2 * | 8/2012 | Chen et al. | 313/110 |
| 8,337,053 B2 * | 12/2012 | Chen et al. | 362/311.06 |
| 8,348,475 B2 * | 1/2013 | Wilcox et al. | 362/332 |
| 8,405,105 B2 * | 3/2013 | Chiang et al. | 257/98 |
| 2002/0080615 A1 | 6/2002 | Marshall et al. | |
| 2004/0070855 A1 | 4/2004 | Benitez et al. | |
| 2006/0081863 A1 * | 4/2006 | Kim et al. | 257/98 |
| 2008/0239722 A1 | 10/2008 | Wilcox | |
| 2009/0067170 A1 | 3/2009 | Bloemen et al. | |
| 2011/0103070 A1 * | 5/2011 | Zhang et al. | 362/311.02 |
| 2011/0141734 A1 * | 6/2011 | Li et al. | 362/235 |
| 2012/0057354 A1 * | 3/2012 | Lee et al. | 362/311.09 |

FOREIGN PATENT DOCUMENTS

| | | |
|---|---|---|
| KR | 10-2008-0056784 A | 6/2008 |
| KR | 100936430 B1 | 1/2010 |
| WO | WO 8600146 A | 1/1986 |
| WO | WO 20100198101 A1 | 2/2010 |

OTHER PUBLICATIONS

Communication dated Oct. 23, 2012, issued by the State Intellectual Property Office of the People's Republic of China in counterpart Chinese Patent Application No. 201110243847.9.
Communication dated Dec. 2, 2011 issued by the European Patent Office in counterpart European Patent Application No. 11170628.9.

* cited by examiner

*Primary Examiner* — David J Makiya
(74) *Attorney, Agent, or Firm* — Sughrue Mion, PLLC

(57) ABSTRACT

An optical lens includes: a lens body having an outer surface extending in a longitudinal direction (a first direction) and formed to be symmetrical in a lateral direction (a second direction); and a cavity formed at a lower portion of the lens body and having inner side faces asymmetrical in the longitudinal direction.

18 Claims, 5 Drawing Sheets

OPTICAL LENS, LED MODULE HAVING THE OPTICAL LENS, AND LIGHTING APPARATUS HAVING THE LED MODULE

CROSS-REFERENCE TO RELATED APPLICATIONS

This application claims the priority of Korean Patent Application No. 10-2010-0082060 filed on Aug. 24, 2010, in the Korean Intellectual Property Office, the disclosure of which is incorporated herein by reference.

BACKGROUND OF THE INVENTION

1. Field of the Invention

The present invention relates to an optical lens, an LED module having the optical lens, and a lighting apparatus, such as a streetlight, having the LED module.

2. Description of the Related Art

Recently, the development of a lighting technique advantageous in terms of environmental friendliness and energy efficiency has emerged as an important issue. Coupled with this, a light emitting diode (LED), having a high efficiency and a long lifespan, as compared with other competing light sources, has been proposed as an alternative to substitute for existing light sources such as an incandescent electric lamp, a fluorescent lamp, and the like. The LED requires a suitable optical system to generate a proper light distribution according to an application field.

General streetlight illumination has light distribution characteristics in which light is spread widely in a direction of a lane axis of a roadway, rather than a symmetrical light distribution, when compared with general indoor illumination or other general illumination. The general street illumination is required to satisfy a light distribution standard according to the width of a road on which streetlights are installed, an amount of vehicle movement thereon, a vehicle speed limit, and the like, and the intensity of illumination and the standard of uniformity ratio of luminance according to the light distribution standard. A general lamp (e.g., a metal halide lamp, an incandescent electric lamp, a fluorescent lamp, and the like) has 360-degree light distribution, so streetlights using such a general lamp implement a side extended light distribution scheme by using a reflector on a rear surface thereof.

However, a streetlight using an LED as a light source cannot adjust a light distribution by using the reflector used for a general streetlight because light is emitted forwardly from an output surface of the LED. Thus, the streetlight having an LED as a light source adjusts its light distribution by using an optical system such as a lens, or the like. A general lighting apparatus using an LED light source largely uses a rotation symmetrical lens. Such a type of lens is not favorably applied to a streetlight that requires a particular light distribution and may be used for illumination that requires a focused or uniform light distribution. An LED illumination lens used for a streetlight requires asymmetrical light distribution characteristics, so an aspheric lens having an asymmetrical shape is used. However, the existing aspheric, asymmetrical lens has a problem in that it is difficult to fabricate a mold for manufacturing a lens and fabrication costs are also increased.

SUMMARY OF THE INVENTION

An aspect of the present invention provides an optical lens capable of reducing the difficulty in fabricating a lens and easily achieving asymmetrical target light distribution characteristics.

Another aspect of the present invention provides an LED light source module having an optical lens capable of reducing the difficulty in fabricating a lens and easily achieving asymmetrical target light distribution characteristics.

An aspect of the present invention provides a lighting apparatus having an optical lens capable of reducing the difficulty in fabricating a lens and easily achieving asymmetrical target light distribution characteristics.

According to an aspect of the present invention, there is provided an optical lens including: a lens body having an outer surface extending in a longitudinal direction and formed to be symmetrical in a lateral direction; and a cavity formed at a lower portion of the lens body and having inner side faces asymmetrical in the longitudinal direction.

The lens body may have a pair of lateral sides disposed to be symmetrical in the lateral direction and forming columnar planes, respectively, and a pair of end portion faces extending in the longitudinal direction, disposed to be parallel to each other, and forming planes, respectively.

The inner side faces of the cavity may be bilaterally symmetrical in the lateral direction. The inner side faces of the cavity may include a plane disposed at one side in the longitudinal direction to constitute a side wall, a spherical face disposed at the other side in the longitudinal direction, and a columnar face connecting the plane and the spherical face. The cavity may be configured such that an LED light source unit is disposed therein.

The lens body may have V-shaped projections at an upper portion thereof. The projections may have a pair of inner side faces and a pair of outer side faces which are opposed to each other, and formed to be bilaterally symmetrical in the lateral direction at an upper portion of the lens. The pair of inner side faces of the projection may be columnar planes, and the pair of outer side faces may be planes.

According to another aspect of the present invention, there is provided an LED light source module including: an optical lens including a lens body having an outer surface extending in a longitudinal direction and formed to be symmetrical in a lateral direction, and a cavity formed at a lower portion of the lens body and having inner side faces asymmetrical in the longitudinal direction; and an LED light source disposed within the cavity of the optical lens. The LED light source may include an LED chip and a dome-shaped lens unit encapsulating the LED chip. The LED light source may be disposed to be deviated from a central portion of the optical lens.

The LED light source module may have a forward directional light distribution angle ranging from 60° to 75° from a vertical axis to one side in the longitudinal direction and a backward directional light distribution angle ranging from 10° to 35° from the vertical axis to the other side in the longitudinal direction on a vertical section taken along the longitudinal direction.

The LED light source module may have a lateral directional light distribution angle ranging from 65° to 75° from the vertical axis to one side in the lateral direction and a lateral directional light distribution angle ranging from 65° to 75° from the vertical axis to the other side in the lateral direction on a vertical section taken along the lateral direction.

The lighting apparatus according to an exemplary embodiment of the present invention may include one or more LED light source modules as described above. This lighting apparatus may be applied for a streetlight. One side of the optical lens in the longitudinal direction may be disposed in the direction of a roadway, the other side of the optical lens in the longitudinal direction may be disposed toward a sidewalk, and a lateral direction of the optical lens may be disposed along a proceeding direction of the roadway.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
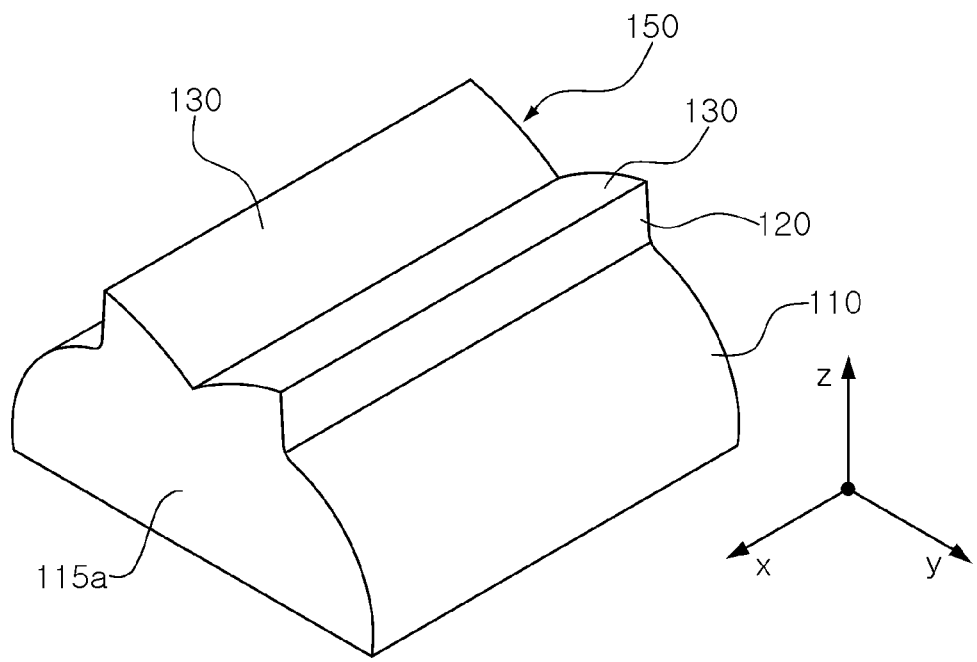
FIG. 1 is a perspective view of an optical lens according to an exemplary embodiment of the present invention.

Exemplary embodiments of the present invention will now be described in detail with reference to the accompanying drawings. The invention may, however, be embodied in many different forms, and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a perspective view of an optical lens according to an exemplary embodiment of the present invention. With reference to FIG. 1, an optical lens according to an exemplary embodiment of the present invention includes a lens body 150 having a hemispheric cylindrical shape with a V-shaped projection formed at an upper portion thereof. The lens body 150 has an outer surface extending in a longitudinal direction (or x-axis direction) and is bilaterally symmetrical or axially symmetrical in a lateral direction (or y-axis direction). In detail, as shown in FIGS. 1 and 2a, the lens body 150 has a pair of lateral sides 110 disposed to be symmetrical in the lateral direction (y-axis direction) and forming columnar planes and a pair of end portion faces 115a and 115b extending in the longitudinal direction (x-axis direction), disposed to be parallel to each other, and forming respective planes.

In addition, the lens body 150 has V-shaped projections. The projections have a pair of inner side faces 130 and a pair of outer side faces 120. The V-shaped projections are formed to be bilaterally symmetrical in the lateral direction (y-axis direction) and extend along the longitudinal direction (x-axis direction). The pair of inner side faces 130 of the V-shaped projections may be formed as columnar planes, and the pair of outer side faces 120 may be formed as planes. The pair of inner side faces 130 constituting columnar planes may be able to maintain a front transmission of light to a degree to contribute to an improvement of the intensity of illumination (to be described). In particular, the pair of inner side faces 130 of the projections may be formed as columnar planes. Namely, in a sectional shape according to the side (which is perpendicular to x axis) defined by a horizontal axis (z axis) and a horizontal axis (y axis), the pair of inner side faces 130 of the projections may draw a circular arc (a portion of a circle).

Figure 2A:
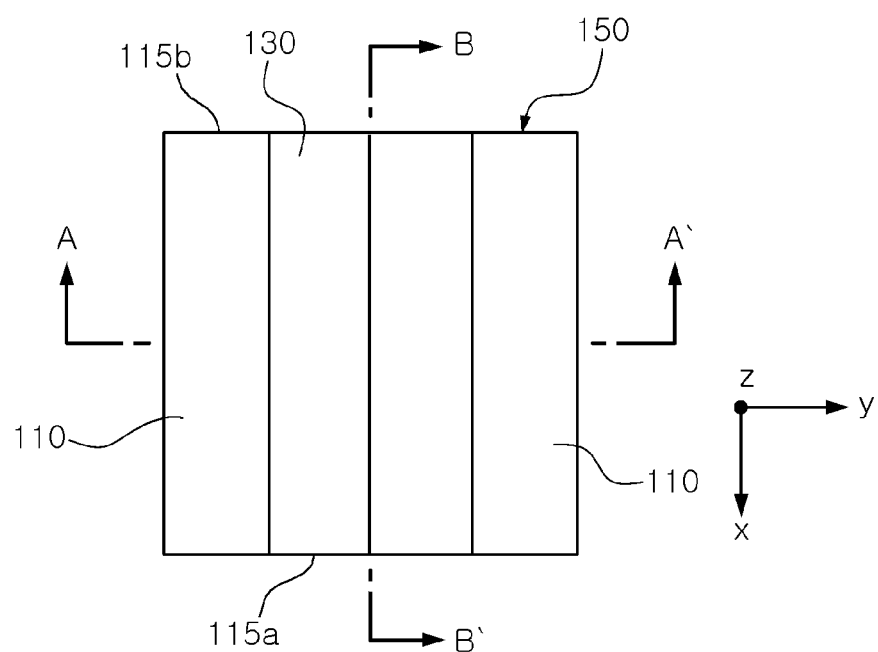
FIG. 2a is a plan view of the optical lens of FIG. 1.
Figure 2B:
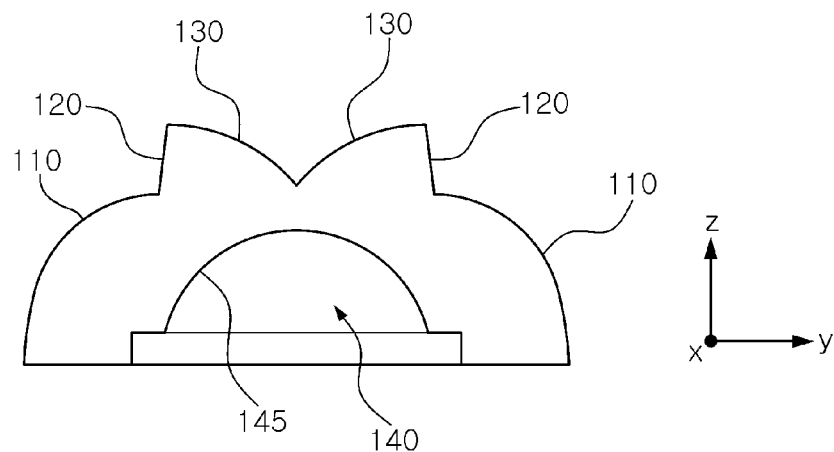
FIG. 2b is a sectional view taken along horizontal line A-A' of the optical lens of FIG. 1.
Figure 2C:
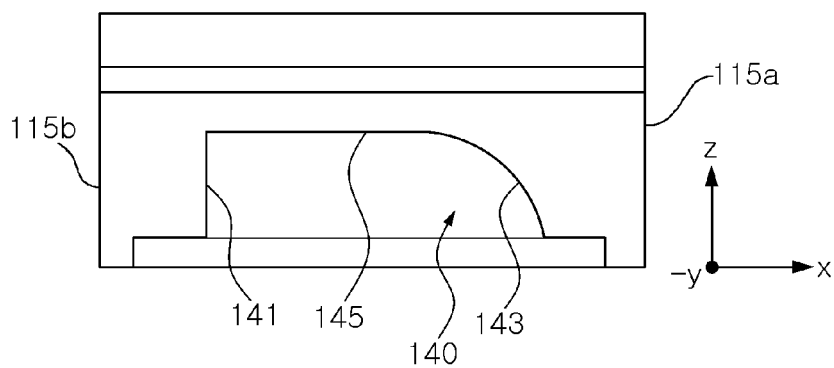
FIG. 2c is a sectional view taken along the vertical line B-B' of the optical lens of FIG. 1.
Figure 2D:
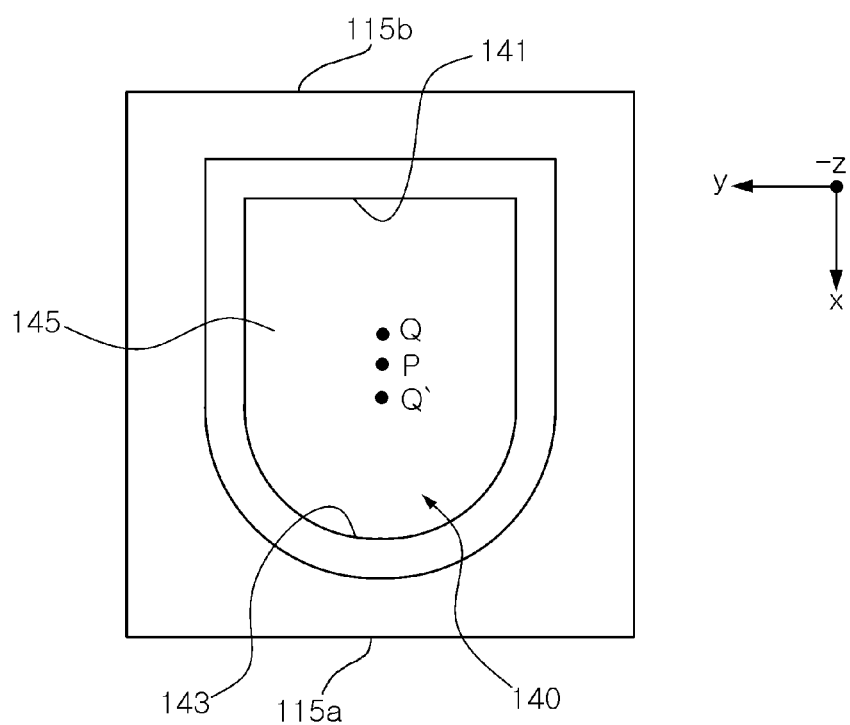
FIG. 2d is a bottom view of the optical lens of FIG. 1.

FIG. 2a is a plan view of the optical lens of FIG. 1, FIG. 2b is a sectional view taken along horizontal line A-A' of the optical lens of FIG. 1, FIG. 2c is a sectional view taken along vertical line B-B' of the optical lens of FIG. 1, and FIG. 2d is a bottom view of the optical lens of FIG. 1.

With reference to FIGS. 1 to 2d, the optical lens includes a space part, namely, a cavity 140, formed at a lower portion of the lens body 150. Inner side faces 145, 141, and 143 of the cavity 140 are formed to be asymmetrical in the longitudinal direction (x-axis direction). In the cavity 140, an LED light source such as an LED package is disposed, and the cavity 140 asymmetrically refracts light emitted from the LED light source disposed therein. As shown in FIGS. 2b and 2d, the cavity 140 may be formed to be symmetrical in the lateral direction (y-axis direction) (bilaterally symmetrical or axially symmetrical).

With reference to FIGS. 2b to 2d, the inner side faces of the cavity 140 include the planar face 141, a spherical face 143, and a columnar face 145. The planar face 141, of the inner side faces of the cavity 140, is disposed at one side (e.g., a side adjacent to the end portion face 115b) in the longitudinal direction (x-axis direction) to constitute a side wall (e.g., a vertical side wall). The spherical face 143 of the inner side surfaces of the cavity 140 is disposed to be adjacent to the other side (i.e., a side adjacent to the end portion 115a) in the longitudinal direction. The columnar face 145 of the inner side faces of the cavity 140 connects the planar face 141 and the spherical face 143. As shown in FIG. 2b, the columnar face 143 of the cavity 140 may form a curved surface (e.g., a cylindrical surface) bilaterally symmetrical on the section perpendicular to the longitudinal direction (x-axis direction).

The one side face 141 and the other side face 143 in the longitudinal direction are formed to be asymmetrical, so the cavity 140 has an asymmetrical structure in the longitudinal direction. An LED light source may be disposed within the cavity 140. Light emitted from the LED light source installed in the cavity 140 is refracted from the inner side faces of the cavity asymmetrical in the longitudinal direction, having a light distribution asymmetrical in the longitudinal direction.

The LED light source disposed in the cavity 140 may be disposed at the center of the optical lens or at a position other than the center (to be described). With reference to FIG. 2b, the light source to be disposed in the cavity may be positioned at a central portion (P) of the optical lens. In another example, the light source may be positioned such that the center of the light source comes at a position (e.g., Q or Q') deviated from the central portion (P) of the optical lens. In this case, a light distribution angle can be advantageously adjusted by changing the position of the light source within the cavity 140 having the vertically asymmetrical structure.

Figure 3:
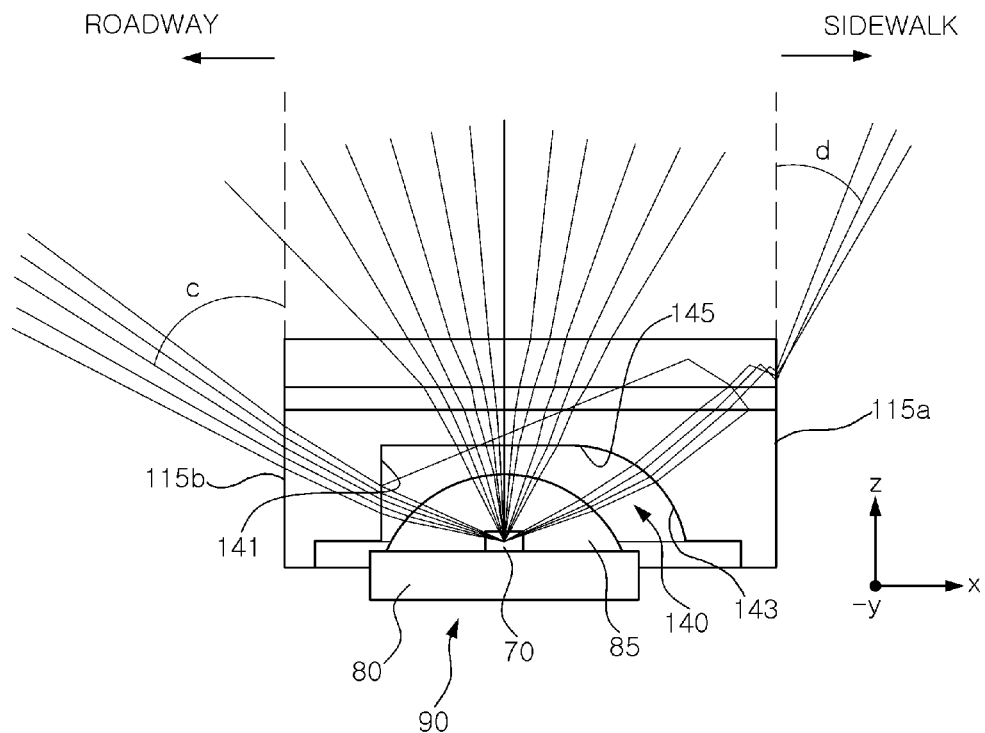
FIG. 3 is a sectional view taken along vertical line of an LED light source module according to an exemplary embodiment of the present invention.

FIG. 3 is a sectional view taken along vertical line (B-B' in FIG. 2a) of an LED light source module obtained by disposing the LED light source within the cavity of the optical lens (See FIGS. 1 to 2d) according to an exemplary embodiment of the present invention. The LED light source module includes an LED light source 90 disposed within the cavity 140 provided at a lower portion of the lens body. The LED light source 90 may be an LED package including an LED chip 70 mounted on a sub-mount 90 and a dome-shaped lens unit 85 encapsulating the LED chip 70. The dome-shaped lens unit 85 may be formed by using a silicon resin or an epoxy resin. The LED light source 90, in particular, the LED chip, may be disposed at a central portion of the lens body as described above, or may be positioned at a portion deviated from the central portion. A light distribution of the overall LED light source module can be adjusted by regulating the position of the LED light source 90.

With reference to FIG. 3, a forward directional light distribution angle (c) may be maintained at an angle ranging from 65° to 75° by using a refraction angle at the planar face 141 of the cavity 140, a refraction angle at an end portion face 115b of the lens body, the position of the LED light source unit 90, or the like. For example, the forward directional light distribution angle (c) may be maintained at an angle of approximately 65° to 75°. Here, the forward directional light distribution angle (c) refers to a light distribution angle measured from a vertical light axis (z axis) to one side (−x direction) in the longitudinal direction on a vertical section taken along the longitudinal direction as shown in FIG. 3.

With reference to FIG. 3, a backward directional light distribution angle (d) may be maintained at 10° to 35° by using a refraction angle on the spherical face 1434 of the cavity 140, a refraction angle at the end portion face 115a of the lens body, the position of the LED light source unit 90, and the like. For example, the backward directional light distribution angle (d) may be limited to be approximately 30°. Here, the backward directional light distribution angle (d) refers to a light distribution angle measured from the vertical light axis (z axis) to the other side (+x direction) in the longitudinal direction on the vertical section taken along the longitudinal direction as shown in FIG. 3.

In this manner, because the cavity 140 having a structure asymmetrical in the longitudinal direction (x-axis direction) at the lower portion of the lens body 150, light emitted from the LED light source 90 has an asymmetrical light distribution in the longitudinal direction or in the forward/backward direction through the optical lens.

Figure 4:
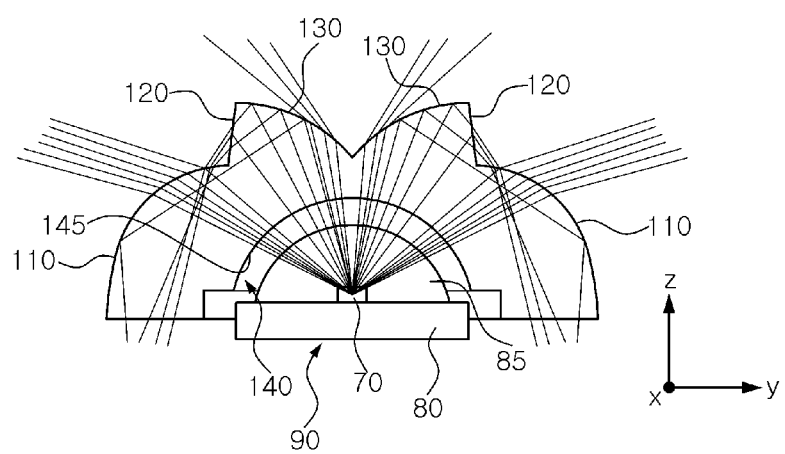
FIG. 4 is a sectional view taken along the horizontal line of the LED light source module according to an exemplary embodiment of the present invention.

FIG. 4 is a sectional view taken along horizontal line (A-A' in FIG. 2a) of the LED light source module according to an exemplary embodiment of the present invention. With reference to FIG. 4, a lateral light distribution can be maintained at 130° to 150° by using the curved surface structure of the columnar face (e.g., the cylindrical face) of the cavity 140 which is bilaterally symmetrical and the lateral side 110 of the lens body which is bilaterally symmetrical. In detail, the LED light source module including the LED light source 90 within the cavity 140 may have a lateral directional light distribution angle of 65° to 75° from the vertical light axis (z axis) to one side (+y direction) in the lateral direction on the vertical section taken along the lateral direction. Also, the LED light source module including the LED light source 90 within the cavity 140 may have a lateral directional light distribution angle of 65° to 75° from the vertical light axis (z axis) to the other side (−y direction) in the lateral direction on the vertical section taken along the lateral direction. Accordingly, the LED light source module can maintain a lateral light distribution at 130° to 150° from the left to the right. For example, the LED light source module may extend the lateral light distribution at 140° or greater by using the foregoing curved surface structures 145 and 110.

The LED light source module (See FIGS. 3 and 4) may be used as a light source module of a lighting apparatus, and in particular, the LED light source module can be usefully applied for a streetlight lighting apparatus. One side (−x direction) in the longitudinal direction of the optical lens, namely, a front directional side of the optical lens, may be disposed to face a roadway and the other side (+x direction) in the longitudinal direction of the optical lens, namely, a rear directional side of the optical lens, may be disposed to face a sidewalk. In this case, illumination having a sufficient light distribution angle (e.g., a forward directional light distribution angle of 65° or greater) can be provided to the roadway and illumination having an appropriate light distribution angle (e.g., a backward directional light distribution angle of about 30°) can be provided to the sidewalk. Also, because the optical lens is disposed such that a lateral direction (y-axis direction) of the optical lens goes along a proceeding (or passage) direction of the roadway, a lateral light distribution of 130° or 140° or larger can be provided along the proceeding direction of the roadway. When the LED light source module is applied to a lighting apparatus such as a streetlight illumination, or the like, a plurality of the foregoing LED light source modules may be installed on a circuit board (not shown).

Figure 5:
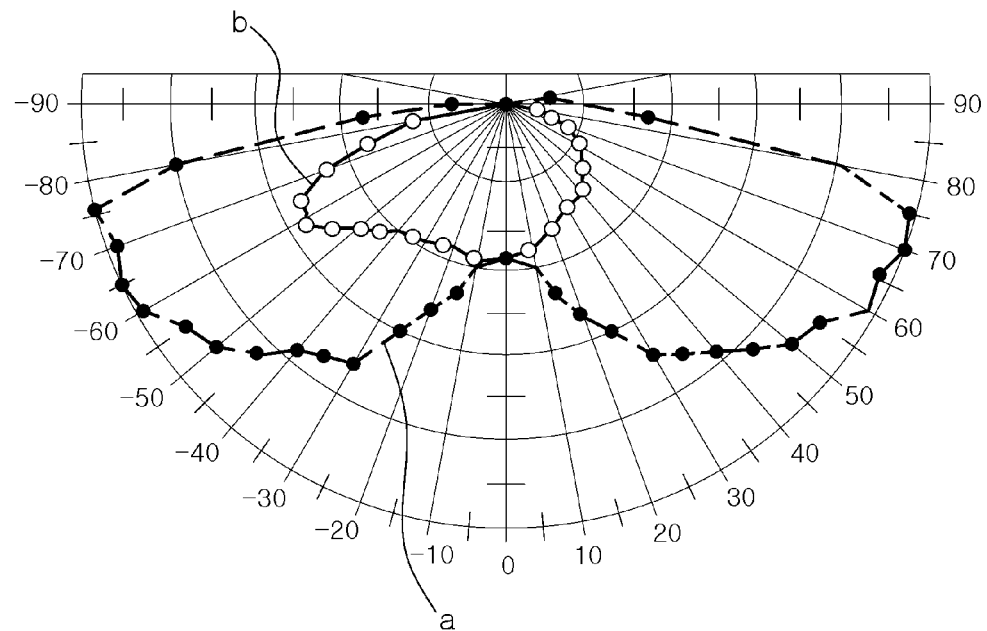
FIG. 5 is a view illustrating a light distribution of the LED light source module according to an exemplary embodiment of the present invention.

FIG. 5 is a view illustrating a light distribution of the LED light source module according to an exemplary embodiment of the present invention. A light distribution obtained from the LED light source module having the structure as described above may be represented as two curved lines (a and b) as shown in FIG. 5. The curved line 'a' represents a light distribution on the vertical sectional view (See FIG. 4) taken along the lateral direction of the LED light source module. As noted by the curved line 'a' of FIG. 5, the horizontal light distribution has a bilaterally symmetrical shape (or axially symmetrical shape), and a relatively large lateral light distribution of approximately 140° (from −70° to 70°) is maintained. The curved line 'b' represents a light distribution on the vertical sectional view (See FIG. 3) taken along the longitudinal direction of the LED light source module. As noted by the curved line 'b' of FIG. 5, the longitudinal directional light distribution has an asymmetrical shape, and a light distribution angle of approximately 60° (−60°) in a forward direction and a light distribution angle of approximately 10° in a backward direction are maintained.

As described above, the LED light source module forms the vertically asymmetrical light distribution, and in this case, the position of the LED light source 90 may be changed in order to adjust the light direction angle in the forward or backward direction. The adjustment of the light distribution angle can be advantageously made by simply changing the installation position of the LED light source 90 without changing the optical lens. Namely, the light distribution angle in the forward or backward direction can be change by approximately 5° to 10° by simply changing the position of the LED light source 90.

Figure 6:
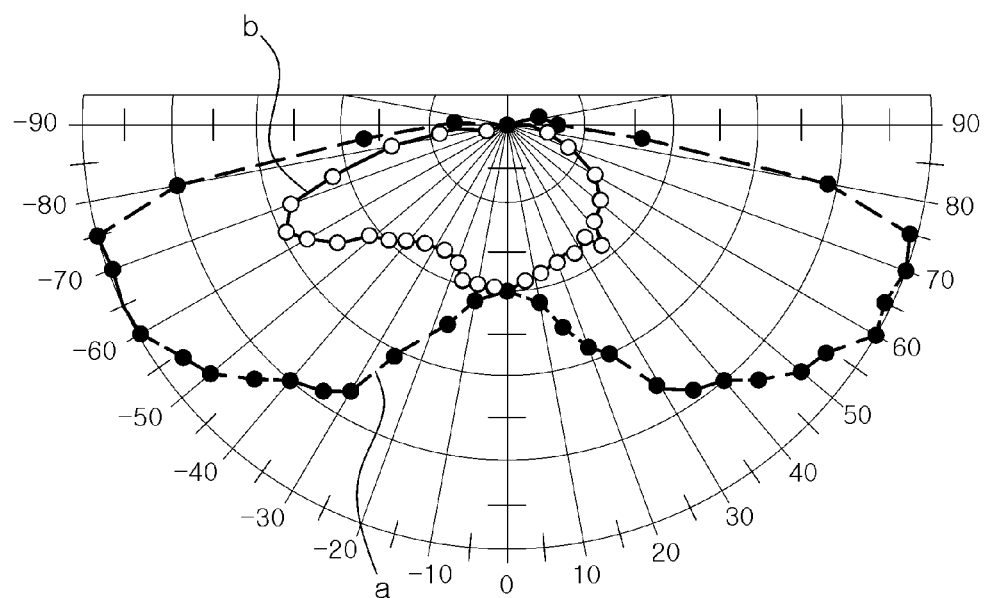
FIG. 6 is a view illustrating a light distribution of the LED light source module when the position of an LED light source is changed according to an exemplary embodiment of the present invention.

FIG. 6 is a view illustrating a light distribution of the LED light source module when the position of an LED light source is changed according to an exemplary embodiment of the present invention. Compared with the light distributions of FIG. 5, it is noted that, when the LED light source 90 is disposed at a central portion of the optical lens, the light distribution angle can be changed to range from 65° to 70° as indicated by a curved line 'b' in FIG. 6. For reference, a curved line 'a' in FIG. 6 represents a light distribution on the vertical sectional view taken along the lateral direction of the LED light source module.

As described above, because the cavity having a vertically asymmetrical structure is formed at a lower portion of the optical lens, the difficulty in fabricating the existing aspheric, asymmetrical lens can be minimized and the intended asymmetry effectively and easily implements the light distribution. In addition, by installing the LED light source within the cavity of the optical lens, light distribution can be formed bilaterally symmetrical and asymmetrical in forward and backward directions. In addition, because the optical lens of the LED light source module according to the present exemplary embodiment can be easily fabricated, the cost for fabricating the light source module can be reduced, and in particular, the LED light source module can be usefully applied for a lighting apparatus, such as a streetlight, that requires a asymmetrical light distribution.

As set forth above, according to exemplary embodiments of the invention, because the cavity having an asymmetrical shape is provided in the lens, a desired asymmetrical light distribution can be easily implemented. Also, a light distribution can be regulated by changing the position of the LED light source disposed within the cavity. In addition, the difficulty in fabricating the lens can be reduced and the cost for fabricating the lens can also be reduced. The optical lens according to an exemplary embodiment of the present invention can be useful as an optical element for an asymmetrical light distribution of an LED light source module for illumination, and in particular, it can be effectively used for a streetlight illumination system using an LED light source.

While the present invention has been shown and described in connection with the exemplary embodiments, it will be apparent to those skilled in the art that modifications and variations can be made without departing from the spirit and scope of the invention as defined by the appended claims.

What is claimed is:

1. An optical lens comprising:
   a lens body having an outer surface extending in a longitudinal direction and formed to be symmetrical in a lateral direction; and
   a cavity formed at a lower portion of the lens body and having inner side faces asymmetrical in the longitudinal direction,
   wherein the inner side faces of the cavity comprises a plane disposed at one side in the longitudinal direction to constitute a side wall, a spherical face disposed at the other side in the longitudinal direction, and a columnar face connecting the plane and the spherical face.

2. The optical lens of claim 1, wherein the lens body has a pair of lateral sides disposed to be symmetrical in the lateral direction and forming columnar planes, respectively, and a pair of end portion faces extending in the longitudinal direction, disposed to be parallel to each other, and forming planes, respectively.

3. The optical lens of claim 1, wherein the inner side faces of the cavity are bilaterally symmetrical in the lateral direction.

4. The optical lens of claim 1, wherein the cavity is configured such that an LED light source unit is disposed therein.

5. The optical lens of claim 1, wherein the lens body has V-shaped projections at an upper portion thereof.

6. The optical lens of claim 5, wherein the projections have a pair of inner side faces and a pair of outer side faces which are opposed to each other, and formed to be bilaterally symmetrical in the lateral direction at an upper portion of the lens.

7. The optical lens of claim 6, wherein the pair of inner side faces of the projection are columnar planes, and the pair of outer side faces are planes.

8. An LED light source module comprising:
   an optical lens including a lens body having an outer surface extending in a longitudinal direction and formed to be symmetrical in a lateral direction, and a cavity formed at a lower portion of the lens body and having inner side faces asymmetrical in the longitudinal direction; and
   an LED light source disposed within the cavity of the optical lens,
   wherein the inner side faces of the cavity comprises a plane disposed at side in the longitudinal direction to constitute a side wall, a spherical face disposed at the other side in the longitudinal direction, and a columnar face connecting the plane and the spherical face.

9. The LED light source module of claim 8, wherein the LED light source comprises an LED chip and a dome-shaped lens unit encapsulating the LED chip.

10. The LED light source module of claim 8, wherein the LED light source is disposed to be deviated from a central portion of the optical lens.

11. The LED light source module of claim 8, wherein the LED light source module has a forward directional light distribution angle ranging from 60° to 75° from a vertical axis to one side in the longitudinal direction and a backward directional light distribution angle ranging from 10° to 35° from the vertical axis to the other side in the longitudinal direction on a vertical section taken along the longitudinal direction.

12. The LED light source module of claim 8, wherein the LED light source module has a lateral directional light distribution angle ranging from 65° to 75° from the vertical axis to one side in the lateral direction and a lateral directional light distribution angle ranging from 65° to 75° from the vertical axis to the other side in the lateral direction on a vertical section taken along the lateral direction.

13. The LED light source module of claim 8, wherein the lens body has a pair of lateral sides disposed to be symmetrical in the lateral direction and forming columnar planes, respectively, and a pair of end portion faces extending in the longitudinal direction, disposed to be parallel to each other, and forming planes, respectively.

14. The LED light source module of claim 8, wherein the lens body has V-shaped projections at an upper portion thereof.

15. The LED light source module of claim 14, wherein the projections have a pair of inner side faces and a pair of outer side faces which are opposed to each other, and formed to be bilaterally symmetrical in the lateral direction at an upper portion of the lens.

16. The LED light source module of claim 15, wherein the pair of inner side faces of the projection are columnar planes, and the pair of outer side faces are planes.

17. A lighting apparatus comprising one or more LED light source modules, wherein each of the LED light source modules comprises:
   an optical lens including a lens body having an outer surface extending in a longitudinal direction and formed to be symmetrical in a lateral direction, and a cavity formed at a lower portion of the lens body and having inner side faces asymmetrical in the longitudinal direction; and
   an LED light source disposed within the cavity of the optical lens,
   wherein the inner side faces of the cavity comprises a plane disposed at one side in the longitudinal direction to constitute a side wall, a spherical face disposed at the other side in the longitudinal direction, and a columnar face connecting the plane and the spherical face.

18. The lighting apparatus of claim 17, wherein the lighting apparatus is applied for a streetlight.

* * * * *